(12) United States Patent
Webb (10) Patent No.: US 7,192,517 B2
(45) Date of Patent: Mar. 20, 2007

(54) COAL-BED-METHANE WATER TREATMENT SYSTEM

(75) Inventor: James Webb, Grass Valley, CA (US)

(73) Assignee: SO2 Solutions, LLC, Sparks, NV (US)

( * ) Notice: Subject to any disclaimer, the term of this patent is extended or adjusted under 35 U.S.C. 154(b) by 183 days.

(21) Appl. No.: 10/791,138

(22) Filed: Mar. 2, 2004

(65) Prior Publication Data

US 2005/0109705 A1 May 26, 2005

Related U.S. Application Data

(60) Provisional application No. 60/452,628, filed on Mar. 6, 2003.

(51) Int. Cl.
*C02F 1/66* (2006.01)
*C02F 103/10* (2006.01)

(52) U.S. Cl. .................... 210/85; 210/87; 210/96.2; 210/103; 210/138; 210/170.01; 210/192; 210/198.1; 210/199; 210/416.1; 210/418; 422/161

(58) Field of Classification Search ............... 210/96.1, 210/170, 172, 192, 198.1, 199, 416.1, 739, 210/743, 747, 750, 752, 757, 85, 87, 103, 210/138, 170.01, 418; 422/161; 47/58.1 SC
See application file for complete search history.

(56) References Cited

U.S. PATENT DOCUMENTS 3,226,201 A * 12/1965 Harmon .................... 422/161
4,526,771 A    7/1985 Forbush et al. ............. 423/543

(Continued)

OTHER PUBLICATIONS

*Assembly Drawings and Part Detail Drawings of Harmon Devices on sale at least as early as Mar. 5, 2002*, pp. 1-38.

(Continued)

*Primary Examiner*—Matthew O. Savage
(74) *Attorney, Agent, or Firm*—Pate Pierce & Baird (57) ABSTRACT

A water treatment system for treating coal-bed-methane (CBM) water. The CBM water treatment system includes a pump system for pumping CBM water from one or many CBM wells into a common reservoir and a solid-based sulfurous generator that produces aqueous sulfurous acid to treat the CBM water and an injection system that increases the amount of calcium contained in CBM water. In one embodiment, the injection system is a gypsum injector that injects soluble gypsum into the CBM water. Moreover, in one embodiment, the solid-based sulfurous generator includes a hydraulic air inlet shut off valve safety system for automatically reducing the combustion air to the sulfurous generator when water is not delivered to the solid-based sulfurous generator. Also, in one embodiment, the water treatment system includes a control system that monitors the pH of the treated water to control the water flow rate through the solid-based sulfurous generator to achieve the desired concentration of sulfurous acid in the CBM water being treated.

20 Claims, 9 Drawing Sheets

U.S. PATENT DOCUMENTS

| | | | | |
|---|---|---|---|---|
| 4,966,757 A | * | 10/1990 | Lewis et al. | 422/62 |
| 5,628,563 A | * | 5/1997 | Fisher | 366/270 |
| 6,080,368 A | | 6/2000 | Jackson | 422/161 |
| 6,248,299 B1 | | 6/2001 | Jackson | 422/161 |
| 6,346,198 B1 | | 2/2002 | Watson et al. | 210/739 |
| 6,500,391 B1 | | 12/2002 | Jackson | 422/161 |
| 6,506,347 B1 | | 1/2003 | Jackson | 422/161 |
| 6,689,326 B1 | | 2/2004 | Jackson | 422/161 |
| 2003/0211018 A1 | | 11/2003 | Jackson et al. | 422/160 |
| 2005/0011820 A1 | * | 1/2005 | Webb | 210/192 |

OTHER PUBLICATIONS

*Installation Instructions for Harmon Devices on sale at least as early as Mar. 5, 2002*, pp. 1-13.

* cited by examiner

COAL-BED-METHANE WATER TREATMENT SYSTEM

RELATED APPLICATIONS

This application claims priority to co-pending U.S. Provisional Patent Application Ser. No. 60/452,628 filed on Mar. 6, 2003.

BACKGROUND

1. Field of the Invention

The present invention relates generally to the treatment of water from coal-bed-methane (hereinafter "CBM") wells and, more particularly, to a CBM water treatment system which utilizes aqueous sulfurous acid produced by a solid sulfur-based sulfurous generator to treat the CBM water and an injection system to further treat the CBM water by increasing the level of calcium in the CBM water.

2. Description of the Prior Art

CBM wells are being developed in increasing numbers throughout the United States and other parts of the world. These wells are drilled into coal seams to withdraw ground water to reduce the hydrostatic pressure on the coal seam. The reduced pressure allows methane gas to migrate to the well bore where it moves to the surface and is collected. Where possible, operators prefer to discharge the produced water into nearby streams, rivers, or other surface water bodies. Depending on the chemical characteristics of the produced water, different levels of treatment are applied to the produced water before discharge. In some locations, produced water cannot be discharged and is injected, reused, or evaporated.

Problematic CBM water typically has an elevated pH and high levels of bicarbonates and sodium. It is not unusual to find CMB water with 300–2000 PPM of bicarbonates and 200–600 PPM of sodium. Water with these characteristics is detrimental to soil, crops and turf. High bicarbonate/high sodium water plugs soil pore spaces and prevents adequate moisture and nutrients from reaching the root structure of crops and grasses.

With water resources in the United States and other parts of the world becoming more scarce, an important environmental challenge is to economically treat and utilize problematic CBM. The most common method that is currently utilized is to irrigate land with CBM water and subsequently spread sulfur and gypsum on the land in an attempt to counteract the deleterious effects of bicarbonates and sodium.

This methodology has several drawbacks. It is difficult spread gypsum and sulfur to irrigated land in a uniform, consistent, and cost-effective basis, especially during austere weather conditions. Moreover, it is doubtful that this methodology effectively resolves the problems associated with high bicarbonates and sodium. Spreading sulfur on land that is irrigated with high bicarbonate water may do little to reduce the level of bicarbonates in soil on a consistent basis. Although much research supports the use of gypsum in leaching sodium through the soil profile, the benefit of gypsum is greatly lessened when high levels of bicarbonates are present. Adding calcium via gypsum to soil being irrigated with high-bicarbonate or high-carbonate water can create calcium carbonate. Not only does calcium carbonate further aggravate soil problems, but less calcium is available to displace sodium.

Thus, there remains a need for a new and improved methodology for treating CBM water, which utilizes aqueous sulfurous acid produced by a solid sulfur-based sulfurous generator to treat CBM water and an injection system that further treats CBM water by increasing the amount of calcium in CBM water, while, at the same time, includes a shut-off safety system to prevent leakage of molten sulfur from the sulfurous generator.

SUMMARY OF THE INVENTION

The present invention is directed to a water treatment system for treating CBM water. The CBM water treatment system includes a solid-based sulfurous generator for producing aqueous sulfurous acid and an injection system to increase calcium levels in CBM water. The sulfurous acid produced by the solid-based sulfurous generator reduces the pH and the amount of bicarbonates of the CBM water. Chemically, the reduction in bicarbonates is explained as follows:

Sulfurous acid plus bicarbonates yields water plus sulfite plus carbon dioxide, with the carbon dioxide gassing off; or $$H_2SO_3 + 2HCO_3^{-1} = 2H_2O + SO_3^{-2} + 2CO_2$$

Similarly, an injection system that increases the amount of calcium in CBM water improves it by counteracting the deleterious effects of sodium, which is often found in CBM water. According to available research, it is generally accepted that calcium helps leach sodium through the soil profile, thereby reducing the adverse effects of sodium. Consequently, when treated CBM water is used for irrigation purposes, calcium is already available in the water to displace the sodium. In one embodiment, soluble gypsum is injected into CBM water by a gypsum injector.

In one embodiment, the solid-based sulfurous generator includes a hydraulic air-inlet shut off valve safety system. Also, the water treatment system may include a control system that monitors the pH of water being treated to control the water flow rate through the generator to achieve the desired concentration of sulfurous acid in the water being treated.

In one embodiment, the CBM water treatment system may include a pump system that delivers CBM water from one or many CBM wells into a common reservoir. The pump system may also deliver CBM water from the reservoir to a solid-based sulfurous generator which adds sulfurous acid to the water and returns it to the reservoir. Treated CBM water in the reservoir is then discharged into an irrigation system or into a stream, river or other surface water body. One or many solid-based sulfurous generators could be used to treat the water in the reservoir, depending on the size of the reservoir and the flow rate of CMB water into and out of the reservoir. As the treated CBM water is pumped out of the reservoir, the CBM water can be further treated. One such method may be to use a gypsum injector to add calcium, via soluble gypsum, into the water to further enhance the water and mitigate the effects of sodium.

In one embodiment, the water from one or many CBM wells may be pumped into a common reservoir. However, several alternatives to using a reservoir are possible. The pump system could deliver the water into a holding tank where the water could be treated by a solid-based sulfurous generator before being delivered into an irrigation system or into a stream, river, or some other surface body of water. Likewise, the CBM water could be pumped directly into a single solid-based sulfurous generator or into a bank of solid-based sulfurous generators for treatment. The treated CBM water may then be pumped into a discharge system, which could be an irrigation system or a system that delivers water to a stream, river, or some other surface body of water.

In one embodiment, a pump system pumps CBM water into a reservoir, to the solid-based sulfurous generator, and into the discharge system. The pump system could be a single pump, a number of separate pumps, or a number of pumps grouped together.

In one embodiment, the aqueous sulfurous acid is produced by a solid-based sulfurous generator having a hydraulic air inlet shut off valve safety system for automatically reducing the combustion air to the generator when water is not delivered to the generator. In one embodiment, the solid-based sulfurous generator includes a solid sulfur supply, a burning chamber for burning the solid sulfur, an air inlet for providing combustion air to the burning chamber, a hot$_{SO2}$ gas outlet, and a mixing and collection chamber.

The burning chamber may further include a water-cooled bottom plate for solidifying molten sulfur in the burning chamber to form a seal. The sealing bottom plate is removable for cleaning the burning chamber. The burning chamber may include an igniter, such as a cal-rod inserted into the burning chamber.

In one embodiment, a negative pressure source downstream from the hot $SO_2$ gas outlet draws $SO_2$ gas out of the burning chamber and combustion air into the burning chamber. The negative pressure source may be a venturi, an air amplifier, or a water aspirator. In one embodiment, the water inlet port on the aspirator may be offset to maximize the "swirling" effect of the water and the negative pressure created by the aspirator. In addition to creating negative pressure to remove $SO_2$ gas from the burning chamber and to draw combustion air into the burning chamber, the introduction of water through the aspirator also serves to mix the $SO_2$ gas with water and convert it into sulfurous acid ($H_2SO_3$).

Also, in one embodiment, a scrub tower may be located downstream from the hot $SO_2$ gas outlet for capturing any residual $SO_2$ gas that was not converted into sulfurous acid by the aspirator. The scrub tower includes a high surface area reaction surface and a supply of water for reacting with the residual $SO_2$ gas. In one embodiment, high surface area reaction surface is a moisture-resistant material, such as rashing rings formed from plastic tubing. In one embodiment, the rashing rings have a length between about 0.5 and 1.5 inches and a diameter between about 0.5 and 1.5 inches. In addition, the flow rate of the water into the scrub tower may be greater than about 80 GPM at greater than about 20 PSI to optimize the conversion of residual $SO_2$ gas into sulfurous acid. This is also referred to as optimum tail removal efficiency.

The scrub tower may further include a vapor recovery means. The vapor recovery means includes an air inlet for providing additional air into the scrub tower, an air mover for removing air and vapors from the scrub tower, and a percolation chamber for receiving and dissipating the air and vapors. In one embodiment, the air mover is a second water aspirator.

In one embodiment, the control system includes a pH sensor for sensing the pH of the water being treated. It also includes a controller connected to the pH sensor for receiving a signal representative of the pH, which it compares to the desired water pH. It then provides an output control signal to a flow control means connected to the controller for adjusting the water flow rate through the solid-based sulfurous generator to achieve the desired concentration of sulfurous acid in the water being. In one embodiment, the flow control means includes either a conventional water valve or a variable frequency drive (VFD). The VFD may control the flow rate of water delivered by a pump system by adjusting the pump speed, said pump being located between the solid-based sulfurous generator and the reservoir. As an alternative, the VFD may also adjust a valve opening to control the water flow rate through the valve, said valve being located between the solid-based sulfurous generator and the reservoir.

The control system may further include a feed load cell for determining the weight of sulfur being fed to the sulfurous generator and a timer circuit for calculating the feed burn rate based on the change in the output of the feed load cell over time. Also, the control system may further include a flow meter for measuring the flow rate of water through the solid-based sulfurous generator and a timer for selectively starting and stopping the solid-based sulfurous generator. In addition, the system may also include a residual chlorine analyzer, such as taught by U.S. Pat. No. 6,346,198, issued to Watson et al. located, for example, near the pH sensor.

Accordingly, one object of the present invention is to provide a CBM water treatment system for treating CBM water that includes a pump system for pumping water from CBM wells and a solid-based sulfurous generator downstream from the pump system for producing aqueous sulfurous acid for treatment of the CBM water.

Another object of the present invention is to provide an injection system for increasing the amount of calcium in CBM water. In one embodiment, the injection system is a gypsum injector that injects soluble gypsum into CBM water.

Another object of the present invention is to provide an apparatus for producing aqueous sulfurous acid, that includes a solid-based sulfurous generator and a hydraulic air inlet shut off valve safety system for automatically reducing the combustion air to the sulfurous generator when water is not delivered to the sulfurous generator.

Still another object of the present invention is to provide a CBM water treatment system for treating CBM water that includes: a pump system for pumping water from CBM wells into a common reservoir; a solid-based sulfurous generator downstream from the pump system for producing aqueous sulfurous acid for treatment of the water, in which the solid-based sulfurous generator includes a hydraulic air inlet shut off valve safety system for automatically reducing the combustion air to the sulfurous generator if water is not delivered to the sulfurous generator; a control system that monitors the pH of the water being treated to control the water flow rate through the solid-based sulfurous generator to achieve the desired concentration of sulfurous acid in the CBM water being treated; and an injection system that increases the amount of calcium in CBM water.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 9, is not intended to limit the scope of the invention, as claimed, but is merely representative of the presently preferred embodiments of the invention.

In the following description, like reference characters designate like or corresponding parts throughout the several views. Also in the following description, it is to be understood that terms such as "forward," "rearward," "left," "right," "upward," "downward," and the like are words of convenience and are not to be construed as limiting terms.

Figure 1:
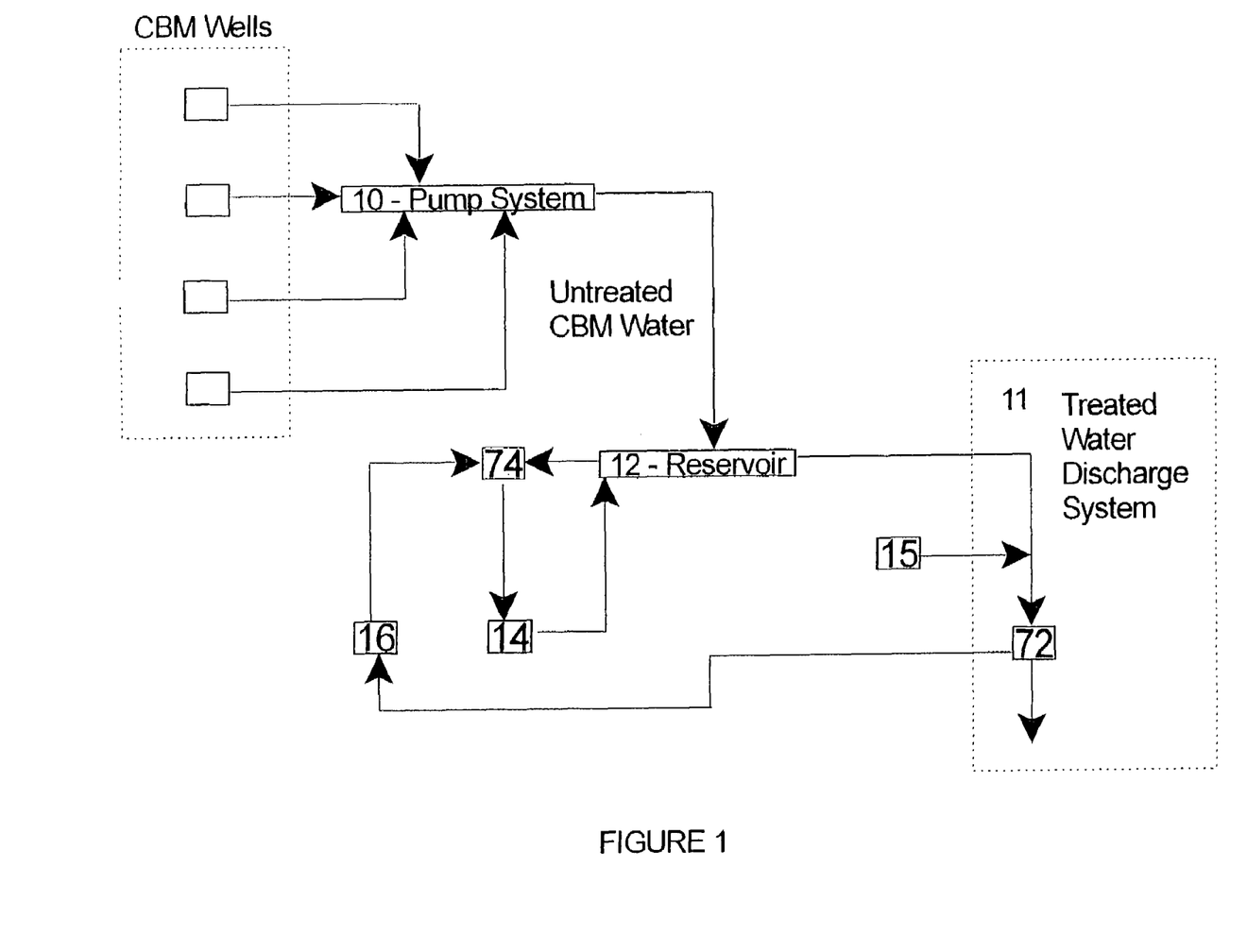
FIG. 1 is a CBM water treatment system constructed according to the present invention.

Referring to FIG. 1, a CBM water treatment system, is shown constructed according to the present invention. The CBM water treatment system includes a pump system 10 to deliver water from one or many CBM wells to a common reservoir 12, a solid-based sulfurous generator 14 for producing aqueous sulfurous acid, an injection system 15 that injects soluble gypsum, or other desired substance, into CBM water, and a control system 16 that monitors the pH of the treated CBM water and uses these data to adjust a flow rate controller 74 which controls the water flow rate through the solid-based sulfurous generator 14 to achieve the desired concentration of sulfurous acid in the CBM water being treated.

The CBM water treatment system generally will also include a discharge system 11 that delivers the treated CBM water from the reservoir 12 into an irrigation system or into a stream, river, or some other surface water body.

It should be understood that substances other than gypsum may be added by the injection system 15 to the treated water discharge system depending on the chemical make-up of the discharged water. For example, ground limestone, potassium sulfate, zinc sulfate, magnesium sulfate, ammonium sulfate, calcium nitrate, UAN-32, humic acid, and iron sulfate may be added individually or in selected combinations to treat, remedy, limit, or correct various, undesirable characteristics that may be found in the CBM water.

Although sulfurous acid ($H_2SO_3$) could be added to the CBM water by injecting compressed sulfur dioxide ($SO_2$) into the water, in the present invention, aqueous sulfurous acid is added from a solid-based sulfurous generator 14. A solid-based system offers advantages in safety and cost effectiveness over using compressed $SO_2$ gas.

As will be discussed in more detail subsequently, the production of aqueous sulfurous acid by the solid-based sulfurous generator 14 is controlled by control system 16. While discussed in more detail later, one example of a preferred embodiment of the control system 16 is shown in FIG. 1. A control system 16 may sense the pH of the treated water using pH sensor 72 to provide feedback to adjust the flow rate controller 74 to control the water flow rate through the solid-based sulfurous generator 14, and thus control the concentration of sulfurous acid in the reservoir of treated CBM water. Also, in one embodiment, the control system 16 may sense the flow rate of water from the CBM wells into the reservoir 12 to provide a further feedback to control the water flow rate through the solid-based sulfurous generator 14. Following treatment, the water may be discharged into a stream, river, or other surface water body or used for irrigation purposes.

Figure 2:
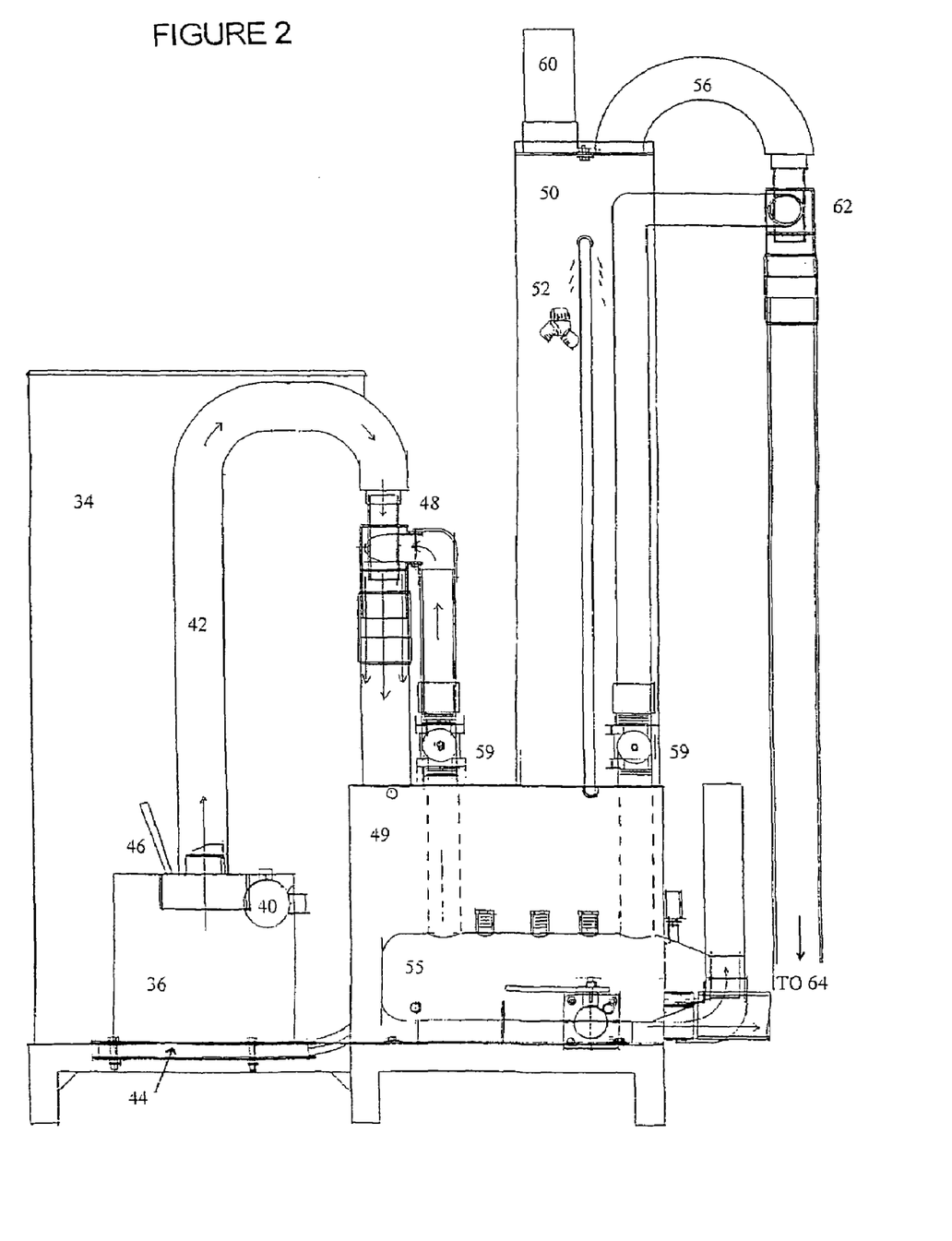
FIG. 2 is an front view of the solid-based sulfurous generator.

Referring to FIG. 2, there is shown a front view of the solid-based sulfurous generator 14. In one embodiment, the solid-based sulfurous generator 14 may include a solid sulfur supply 34, burning chamber 36, and an air inlet 40 for providing combustion air to the burning chamber 36. Hot $SO_2$ gas exits the burning chamber 36 through the gas outlet 42 where it may be subsequently mixed and collected in mixing and collection chamber 49.

The burning chamber 36 includes a water-cooled sealing plate 44, which forms the bottom of the burning chamber 36. The cooler temperature of the ring causes the molten sulfur formed in the burning chamber 36 to solidify and seal the bottom of burning chamber 36 during normal operation. However, this "gasket-free" seal also allows the bottom plate of the burning chamber 36 to be easily removed for cleaning and maintenance of the burning chamber 36. In one embodiment, the solid sulfur received in the burning chamber 36 from the solid sulfur supply 34 is initially ignited by an electrically powered igniter 46, such as a cal-rod.

Figure 4:
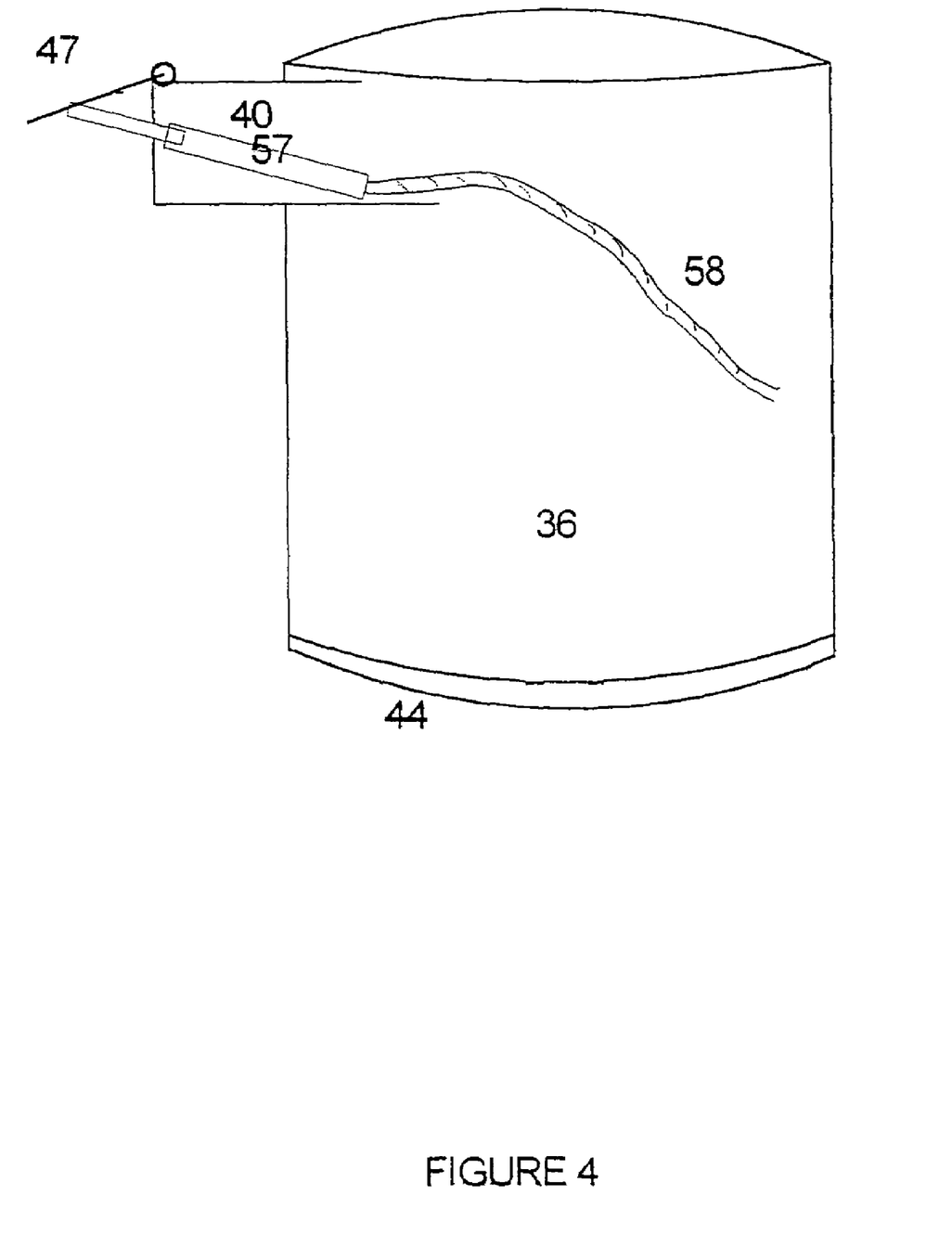
FIG. 4 is an enlarged partial-side view of the solid-based sulfurous generator shown in FIG. 2, illustrating the hydraulic air inlet shut off valve safety system.

As best seen in FIG. 4, in one embodiment, the solid-based sulfurous generator 14 includes a hydraulic air inlet shut off valve safety system 47,57,58. The hydraulic air inlet shut off valve safety system 47,57,58 uses water pressure, delivered by water line 58, to extend a piston in the hydraulic cylinder 57 which opens the valve 47 on the air inlet 40 allowing air to enter the burning chamber 36. When water stops being delivered to the generator 14, the piston retracts. Gravity then closes the valve 47 reducing the flow of air and oxygen through the air inlet 40. The reduced supply of oxygen causes combustion to cease in the burning chamber 36. Without this safety system 47,57,58, the molten sulfur could continue to burn and possibly leak from the generator 14 creating a safety hazard and possibly a fire.

Referring back to FIG. 2, the solid-based sulfurous generator 14 preferably is operated using a negative pressure source 48 for drawing $SO_2$ gas out of the burning chamber 36 and combustion air into burning chamber 36 to produce the aqueous sulfurous acid mixture. The negative pressure source 48 is preferably downstream from the burning chamber 36, significantly reducing the likelihood of $SO_2$ gas escaping from the burning chamber. The negative pressure source 48 can be any or several types of air movers, including venturis and air amplifiers.

In one embodiment (see FIG. 8), the negative pressure source 48 for the burning chamber 36 is a kinetic jet-type water aspirator with an offset water inlet port (see FIG. 9), such as a GT-300 Main Aspirator available from Aqua $SO_2$, Inc. of Grass Valley, Calif. The aspirator 48 operates by moving water through directed jets, which creates a negative pressure upstream from the jets. In addition, since the purpose of the solid-based sulfurous generator 14 is to produce aqueous sulfurous acid, the water aspirator 48 also introduces water and mixes it with the $SO_2$ gas to produce sulfurous acid. By designing the aspirator 48 with an offset water inlet port (see FIG. 9), a greater "swirling" effect is produced which increases the negative pressure created by the aspirator 48 when compared to aspirators with non-offset or centered water inlet ports. This results in higher burn rates at given flow rates when compared to non-offset aspirators of the same size. In addition, the greater "swirling" effect mixes more $SO_2$ gas with water leaving less residual $SO_2$ gas to be captured in the scrub tower when compared to non-offset aspirators of the same size, which results in fewer $SO_2$ emissions.

Figure 8:
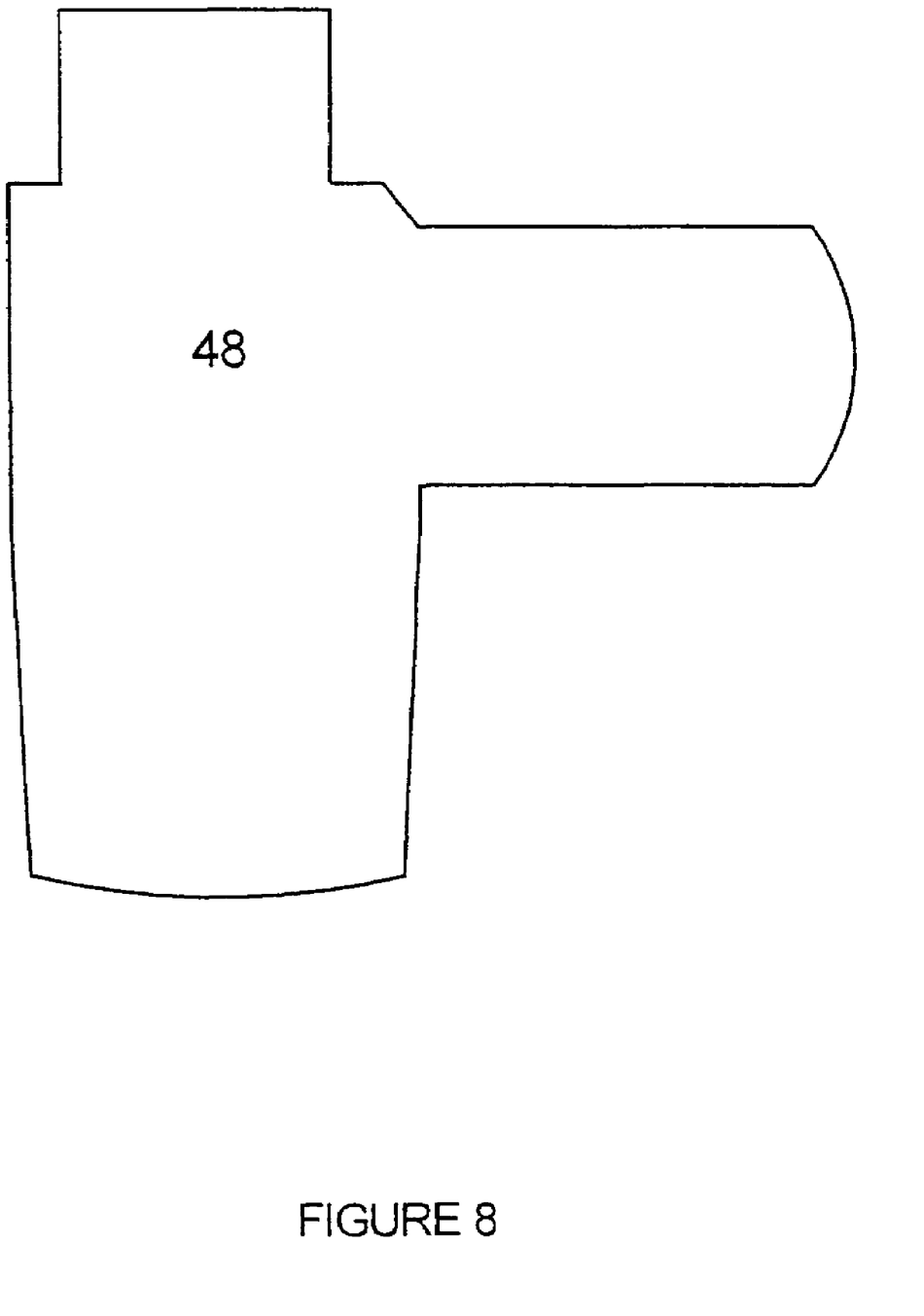
FIG. 8 is a side view a water aspirator.
Figure 9:
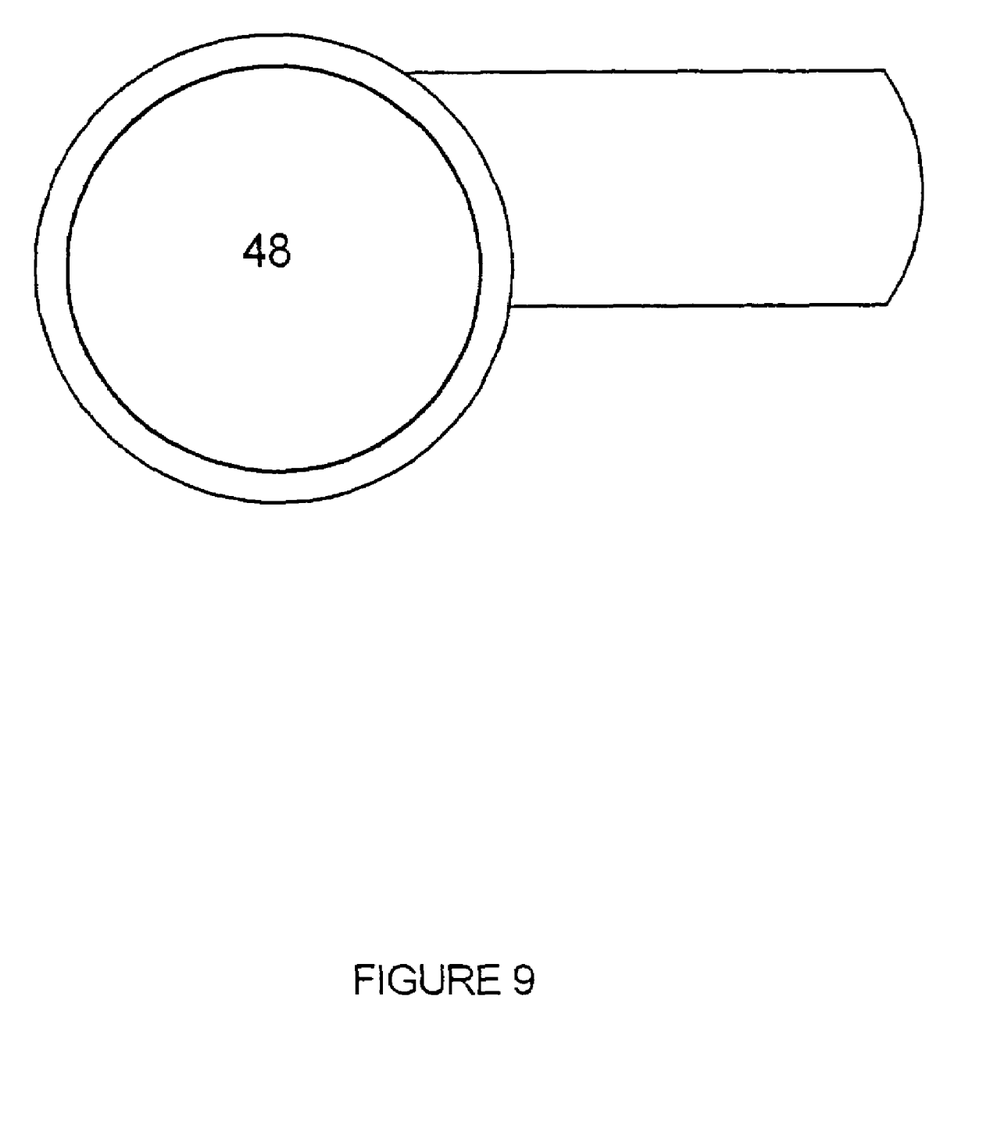
FIG. 9 is a top view of a water aspirator illustrating the offset water inlet port.

This aspirator 48, which removes $SO_2$ gas from the burning chamber and draws air and oxygen into the burning chamber by creating a negative pressure source, can also be referred to as the "main aspirator" (to distinguish it from the vapor-recovery aspirator).

Figure 3:
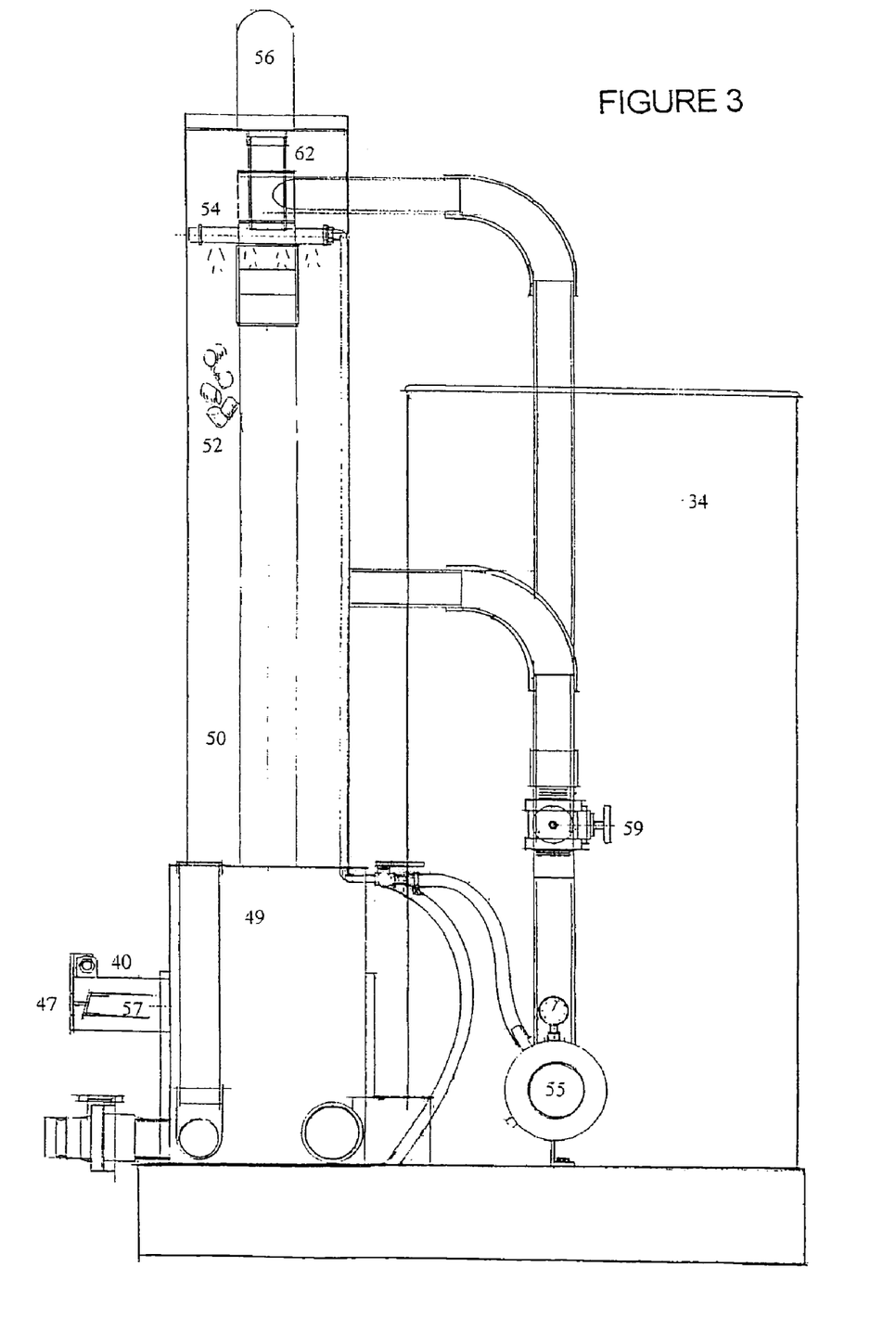
FIG. 3 is a right-side view of the solid-based sulfurous generator shown in FIG. 2.

FIG. 3 is a right-side view of the solid-based sulfurous generator that was shown in FIG. 2, illustrating the scrub tower 50 and vapor recovery means 56. The scrub tower 50 includes a high surface area, reactive surface material 52 and a supply of water 54 for mixing with any residual $SO_2$ that arises from the mixing and collection chamber 49. In one embodiment, the water is supplied from a manifold 55 which also supplies water to the main aspirator 48, the air mover 62 and the burning chamber cooling ring 36. Adjustable gate valves 59 and conventional pressure gauges may be used to adjust the flow of water through both the main aspirator 48, the air mover 62, and the scrub tower 50.

In one embodiment, the high surface area, reactive surface material 52 is a moisture-resistant material such as polyethylene plastic. These materials may be formed from a tube of plastic, which is cut into lengths of between about ½ and 1½ inches for a tube having a diameter between about ½ and 1½ inches to form "rashing" rings. In one embodiment, the rashing rings are formed from ¾ inch inner diameter PVC pipe cut into 1¼ inch lengths.

Figure 5:
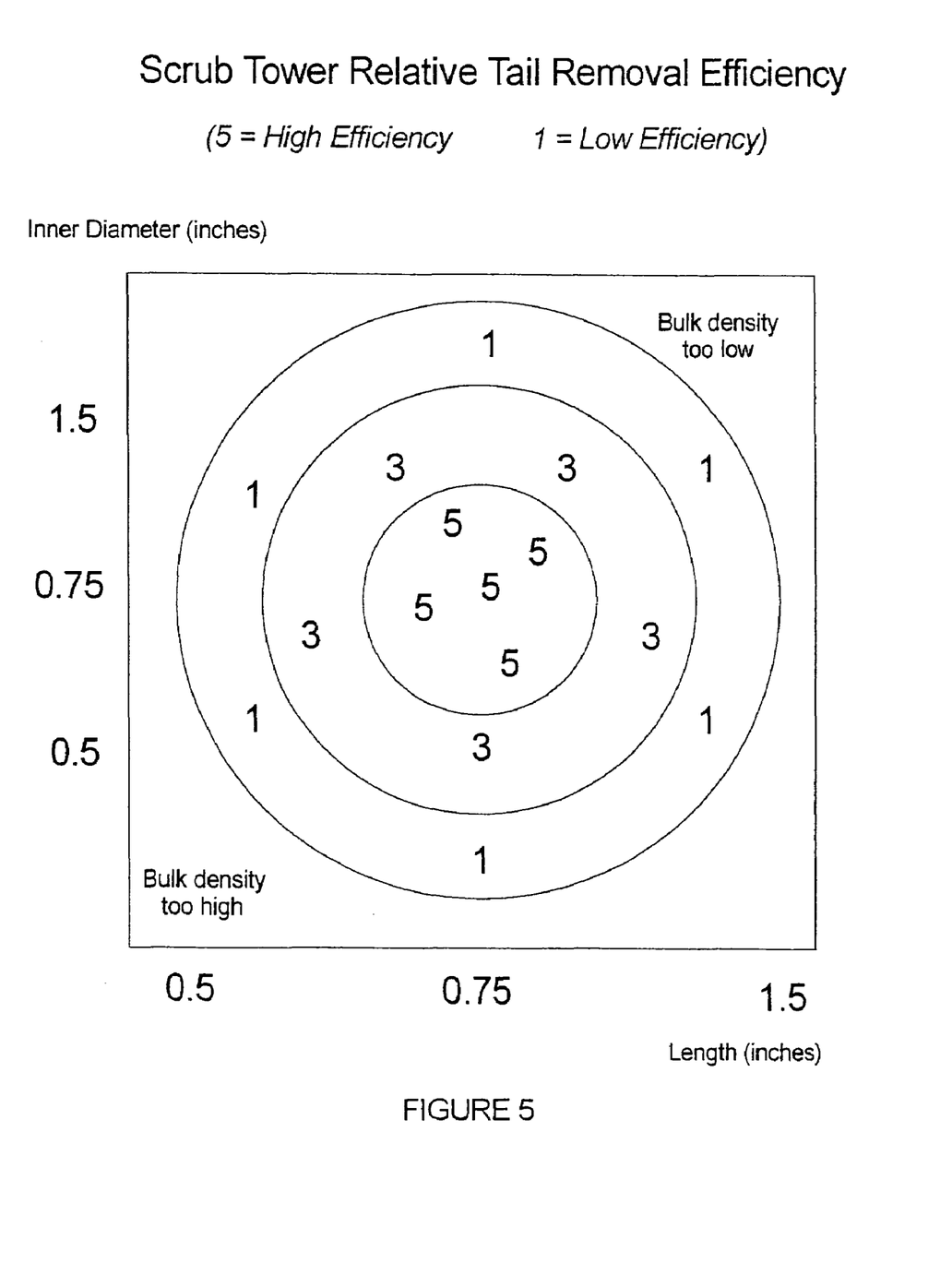
FIG. 5 is a graphical representation of relative tail removal efficiency of the scrub tower as a function of inner diameter and length of the rashing rings.

FIG. 5 provides a graphical representation of relative "tail removal efficiency" of the scrub tower 50 as a function of inner diameter and length of the rashing rings. (Tail removal efficiency may be defined as the efficiency of converting residual $SO_2$ into sulfurous acid. The residual $SO_2$ being any $SO_2$ gas that was not converted into sulfurous acid by the introduction of water through the main aspirator 48.) As may be seen in FIG. 5, the maximum efficiency for tail removal is generally in the range of a ¾ inch inner diameter and a ¾ inch length. Smaller sized rashing rings result in too high a bulk density for the rings and may not allow the water that is capturing the $SO_2$ gas to pass through the rings without puddling. In addition, as the rashing rings become too large and too long, the bulk density becomes too low and there is not sufficient surface area to efficiently capture the residual $SO_2$ gas. Moreover, having approximately the same diameter and length produces a random and torturous path through the high surface area, reactive surface 52, which is desirable for improved efficiency.

Figure 6:
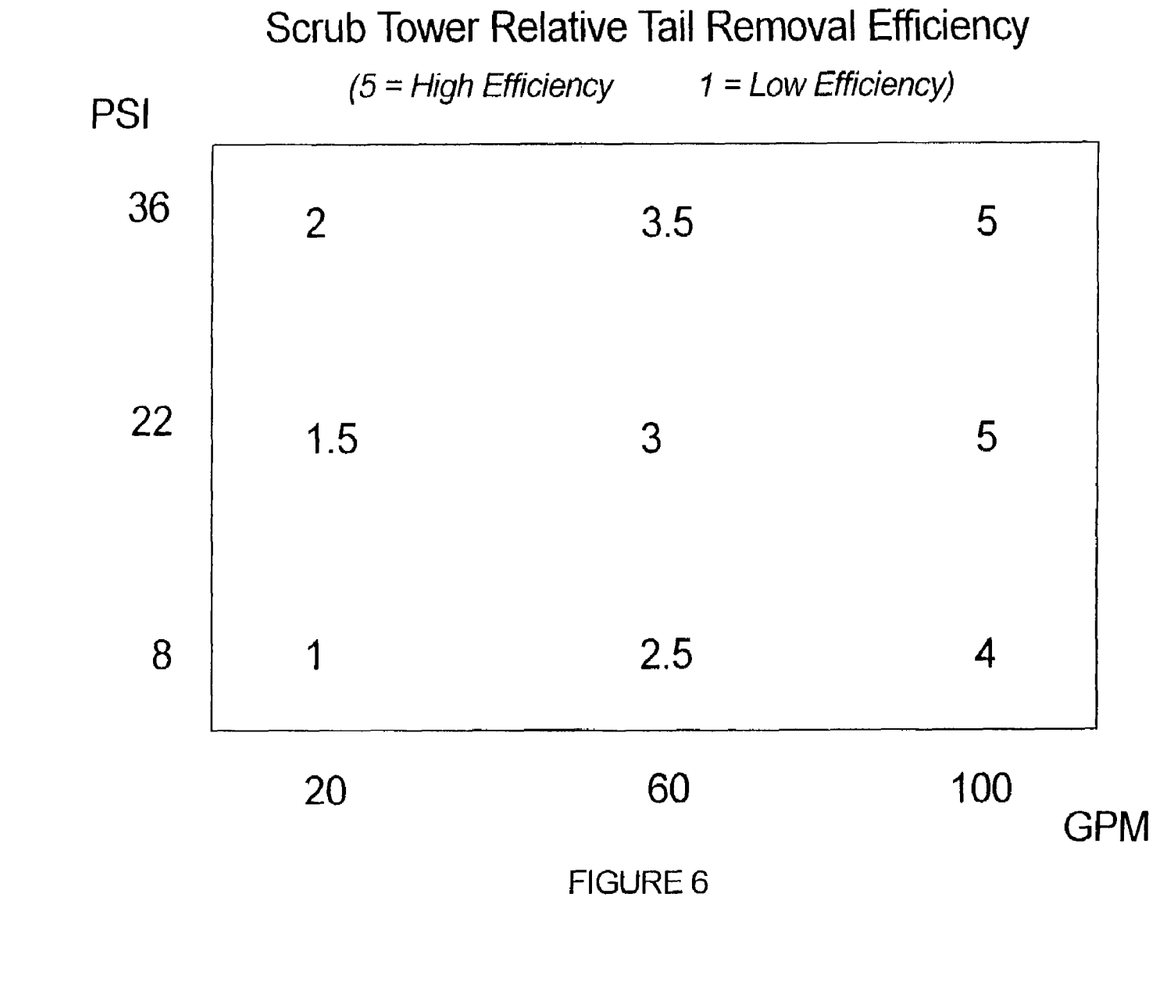
FIG. 6 is a graphical representation of relative tail removal efficiency of the scrub tower as a function of the water pressure and flow rate of the water into the scrub tower.

As best seen in FIG. 6, there is shown a graphical representation of relative tail removal efficiency of the scrub tower 50 as a function of the water pressure and flow rate of the water into the scrub tower. As may be seen in FIG. 6, the maximum efficiency for tail removal is generally in the range of greater than about 20 PSI and a flow rate of greater than about 80 GPM. While not intended to limit the scope of the present invention, it is believed that this is primarily due to kinetic mixing. Consequently, lower flow rates at higher pressure and higher flow rates at lower pressures may perform similarly.

Referring back to FIG. 2, the vapor recovery means 56 is attached through the top of scrub tower 50. The vapor that the vapor recovery means is intended to recover, is primary a mixture of water vapor and diatomic nitrogen, which remains after the oxygen in the combustion air is combined with the burning sulfur. The mixture of water vapor and diatomic nitrogen appears as a "white" plume, which may be cosmetically unappealing to some users. The vapor recovery means 56 includes an air inlet 60 and an air mover 62, possibly a second water aspirator, for moving air through the scrub tower 50 to a percolation chamber 64 (not shown). In one embodiment, the percolation chamber 64 is a length of conventional drainpipe buried under the earth, which provides sufficient time for the diatomic nitrogen to recombine and loose its "white" appearance.

Figure 7:
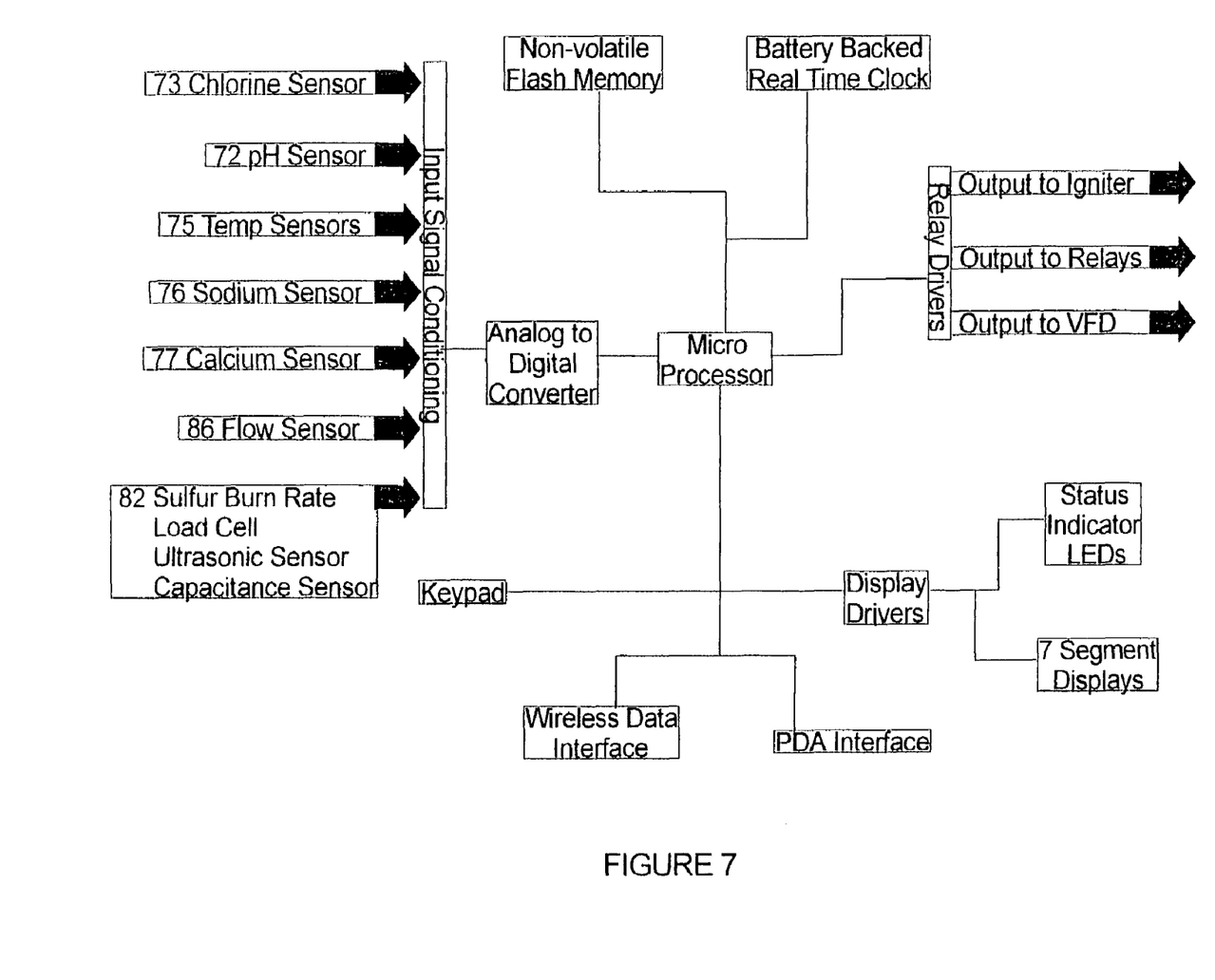
FIG. 7 is a function block diagram of the control system, which controls the production of aqueous sulfurous acid.

Finally, FIG. 7 displays a function block diagram of the control system 16 for the sulfurous generator. The control system 16 monitors the pH of the treated water and adjusts the flow rate of the generator 14 to maintain the water pH at a preset level. The control system 16 is microprocessor based and includes a pH sensor 72 and a flow rate controller 74. The pH sensor 72 senses the pH of the treated water and sends this information to the microprocessor. The microprocessor compares the sensed pH to the desired pH setting and provides an output control signal to the flow rate controller 74 indicating whether the water pH should be higher or lower. The flow rate controller 74 then adjusts the pump speed, which, in turn, affects the flow of water through the generator 14 and the amount of aqueous sulfurous acid produced by the solid-based sulfurous generator 14. As an alternative to adjusting the pump speed, the flow rate controller 74 could also adjust a valve opening to control the flow of water through the generator 14 and the amount of aqueous sulfurous acid that is produced.

In one embodiment, the flow rate controller 74 may be a variable frequency drive (hereinafter "VFD") for controlling the water flow rate that is delivered to the solid-based sulfurous generator 14. As an alternative, the VFD may adjust a valve opening to control the flow rate, said valve being located between the pump system 10 and the solid-based sulfurous generator 14.

In one embodiment, the control system 16 may further include a sulfur burn rate sensor 82, such as a feed load cell, which determines the weight of sulfur that is present in the sulfur storage bin. The microprocessor-based control system 16 may also include a timer circuit for calculating the feed burn rate based on the change in the output of the feed load cell over time. In addition, the control valve 74 may further include a flow meter for measuring the flow rate of water through the solid-based sulfurous generator 14. Finally, the control system 16 may include a timer for selectively starting and stopping the solid-based sulfurous generator 14.

In one embodiment, the microprocessor-based controller 16 is a single board microprocessor, such as those available from Motorola having a Motorola 68HC12, which includes an embedded microchip processor. This may provide a single chip solution, which includes onboard RAM, ROM and a real-time clock. Signal conditioning, relay drivers, keypad and display drivers are also on one board. In addition, a wireless data interface may be connected to a RF 32 port on the control system 16. The wireless data interface is then connected to a conventional third party wireless transmitter for transmitting the RF 32 signal to a remote receiver, such as a central PC (not shown). Similarly, the control system 16 also includes an infrared LED, which allows the operator to walk up with a PDA and download the data that are stored.

In operation, the outputs of the microprocessor-based controller 16 are used to actuate relay drivers. For example, relays may control a flow valve to and from the generator 14. Also, the VFD may get a low voltage signal to change the speed of a pump connected to the generator 14. The same outputs can also be used to control the igniter 46 in order to turn on the cal-rod for igniting the sulfur in the burning chamber. Other outputs could be used to turn on a light pole as an indicator that the generator is functioning, is in standby, or is defective. This type of indicator is particularly useful at sites where it is helpful to see the status of the system from afar so the operator could tell that the system is running because the green light is on, is in standby, is defective, or low on sulfur because the yellow light is on.

In one embodiment, controller 16 may have sixteen analog inputs so that up to sixteen different types of sensors can be monitored. The controller 16 may log the data from many different sensors by taking samples once a minute or some other time interval. The controller 16 may store the data in memory and provide downloads through a wireless data interface, a PDA interface, or to a display driver or LED.

The controller 16 may contain a battery-operated, real-time clock chip on the circuit board that stores the time and day whether the unit has power or not-preventing a loss of data during a power failure. Various settings such as targeted pH, generator run times, and start and stop times may be stored in a non-volatile flash memory. These parameters may be permanently stored in memory and saved even during power loss. The numeric values for the different sensors may be displayed on the seven segment displays.

The software may perform three different functions. First, there may be a timer, which is an event sequencer that knows the time of day and certain events at certain times. The operator interface allows the user to establish set-up functionalities such as the time of day, the start time, the end time, the generator run time, and the igniter configurations and burn time. Second, the controller 16 has three different modes which affect the sulfurous generator. The stop mode prevents it from running, the manual mode runs it for a certain amount of time or indefinitely, and finally, the auto-mode uses the time of day to determine when to start and stop running.

For example, auto-mode may be set to start the sulfurous generator at 11:00 AM. Automode may go through a start-up sequence. It may check the time of day, start the pump, start the igniter 46, burn the igniter 46 for the specified time period (15 seconds for example), check the flow rate and adjust the pump to establish the optimal flow rate. Finally, it may check some parameters to make sure that the temperature in the burning chamber 36 is sufficient for proper combustion. To shut down, it may turn off the flow of water. The hydraulic air inlet valve 47 may then close, cutting off oxygen to the burning chamber which causes combustion to cease. Automode may then re-sets itself to start and stop at another pre-determined time.

The controller 16 may also control an injection system for adding nutrients, such as solution-grade gypsum, into the water. This system includes a tank having a solution of materials or fertilizers, which can be injected into the CBM water. There also may be other basic timer controller events (such as aeration or circulation), which use the time of day to start and stop some other device that aerates or circulates the water in a holding tank or pond.

Certain modifications and improvements may occur to those skilled in the art upon a reading of the foregoing description. By way of example, while single sulfurous generators according to the present invention may be used in most applications, in some applications it may be advantageous to gang several generators together. This could be advantageous for creating redundancy and additional capacity.

Another modification may be to utilize a large, central storage device to feed sulfur into a single generator or into multiple generators. Also, while the control system may further include a feed-load cell for determining the weight of sulfur, the mass flow of the sulfur could also be determined by ultrasonic or capacitance sensors. These data could then be used to calculate the actual volume of material inside the chamber, to estimate the burn rate and to predict when the sulfur will run out.

In one embodiment, a control system 16 may sense the pH of the treated water and provide feedback to adjust the flow rate of water through the generator 14 so the pH of the water being treated increases, decreases, or stays the same. The control system 16 may also sense the flow rate of water into the reservoir 12 and provide feedback to adjust the generator 14 output to reduce, increase or maintain the concentration of sulfurous acid in the water being treated. These parameters could also be manually measured and adjusted. It should be understood that there are many modifications and improvements within the scope of the present invention.

The present invention may be embodied in other specific forms without departing from its spirit or essential characteristics. The described embodiments are to be considered in all respects only as illustrative, and not restrictive. All changes which come within the meaning and range of equivalency of the claims are to be embraced within their scope.

What is claimed and desired to be secured by United States Letters Patent is:

1. An apparatus for treating coal-bed-methane water, the apparatus comprising:
    a pump delivering coal-bed-methane water from at least one coal-bed-methane well into a reservoir;
    a generator producing aqueous sulfurous acid to treat the coal-bed-methane water containing in the reservoir; and
    an injection system injecting soluble gypsum into the coal-bed-methane water to further treat the coal-bed-methane water.

2. The apparatus of claim 1, further comprising a control system to control a water flow rate through the generator to achieve a desired concentration of sulfurous acid.

3. The apparatus of claim 2, wherein the control system comprises a pH sensor to ascertain, the pH of the treated coal-bed-methane water; a controller connected to the pH sensor to receive a signal representative of the pH, comparing the signal to a set point for a desired water pH, and providing an output control signal, to a control means to adjust the water flow rate to achieve a desired concentration of sulfurous acid.

4. The apparatus of claim 3, wherein the control means comprises a variable frequency drive (VFD) to adjust the water flow rate.

5. The apparatus of claim 3, wherein the control means comprises a variable frequency drive (VFD) to adjust the water flow rote through a valve, flow valve controlling the water flow rate through the generator.

6. The apparatus of claim 2, wherein the control system comprises a flow rate sensor to measure the water flow rate into the reservoir; a controller connected to the flow rate sensor to receive a signal representative of the flow rate and to provide an output control signal to a flow control means to adjust the water flow rate through the generator to achieve a desired concentration of sulfurous acid.

7. The apparatus of claim 2, wherein the control system comprises a feed load cell to determine the weight of sulfur fed to the generator.

8. The apparatus of claim 7, further comprising a timer circuit to calculate a burn bum rate based on a change of an output of the feed load cell overtime.

9. The apparatus of claim 2, wherein the control system comprises a flow meter to measure the water flow rate.

10. The apparatus of claim 2, wherein the control system comprises a timer to selectively start told stop the generator.

11. An apparatus for treating coal-bed-methane water, the apparatus comprising:
    a pump pumping coal-bed-methane water from at least one coal-bed-methane well into a reservoir;
    a generator producing aqueous sulfurous acid to treat the coal-bed-methane water contained in the reservoir;
    an injection system injecting soluble gypsum into the coal-bed-methane water to further treat the coal-bed-methane water; and
    a control system comprising a control, a pH sensor to ascertain the pH of the treated coal-bed-methane water, and a controller receiving from the pH sensor a signal representative of the pH, comparing the signal to a set point for a desired water pH, and providing an output control signal to the control acting on the output control signal and adjusting a water flow rate through the generator to achieve the desired water pH.

12. The apparatus of claim 11, wherein the control comprises a variable frequency drive (VFD) to adjust the water flow rate.

13. The apparatus of claim 11, wherein the control comprises a variable frequency drive (VFD) to adjust the water flow rate through a valve, the valve controlling the water flow rate through the generator.

14. The apparatus of claim 11, wherein the control system further comprises a feed load cell to determine the weight of sulfur fed to the generator.

15. The apparatus of claim 14, wherein the control system further comprises a timer circuit to calculate a feed burn rate based on a change of an output of the feed load cell over time.

16. An apparatus for treating coal-bed-methane water, the apparatus comprising:
    a pump pumping coal-bed-methane water from at least one coal-bed-methane well into a reservoir;
    a generator producing aqueous sulfurous acid to treat the coal-bed-methane water contained in the reservoir; and
    a control system comprising a control, a pH sensor to ascertain the pH of the treated coal-bed-methane water, and a controller receiving from the pH sensor a signal representative of the pH, comparing the signal to a set point for a desired water pH, and providing an output control signal to the control acting on the output control signal and adjusting a water flow rate through the generator to achieve the desired water pH.

17. The apparatus of claim 16, wherein the control comprises a variable frequency drive (VFD) to adjust the water flow rate.

18. The apparatus of claim 17, wherein the control comprises a variable frequency drive (VFD) to adjust the water flow rate through a valve, the valve controlling the water flow rate through the generator.

19. The apparatus of claim 18, wherein the control system further comprises a feed load cell to determine the weight of sulfur fed to the generator.

20. The apparatus of claim 19, wherein the control system further comprises a timer circuit to calculate a feed bum rate based on a change of an output of the feed load cell over time.

\* \* \* \* \*